US008468529B2

(12) United States Patent
Mohanty et al.

(10) Patent No.: US 8,468,529 B2
(45) Date of Patent: Jun. 18, 2013

(54) CORRELATING, LOGGING AND TRACING MESSAGING EVENTS BETWEEN WORKFLOW INSTANCES WITH GLOBALLY UNIQUE IDENTIFIERS

(75) Inventors: Sumit Mohanty, Redmond, WA (US); John Anthony Taylor, Bellevue, WA (US); Vikram Desai, Bellevue, WA (US); Kenneth D. Wolf, Seattle, WA (US); Haoran Andy Wu, Sammamish, WA (US); Michael Josef Krejcik, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 802 days.

(21) Appl. No.: 12/473,124

(22) Filed: May 27, 2009

(65) Prior Publication Data

US 2010/0306777 A1    Dec. 2, 2010

(51) Int. Cl.
*G06F 9/46* (2006.01)
(52) U.S. Cl.
USPC ........................................... 718/101; 718/106
(58) Field of Classification Search
None
See application file for complete search history.

(56) References Cited

U.S. PATENT DOCUMENTS

| 6,073,109 | A  | * | 6/2000  | Flores et al. ............... 705/7.13 |
| 6,594,636 | B1 |   | 7/2003  | Sakaguchi |
| 7,370,333 | B2 |   | 5/2008  | Mehta |
| 7,761,851 | B2 | * | 7/2010  | Bailey et al. ............... 717/121 |
| 7,974,939 | B2 | * | 7/2011  | Nanjangud Bhaskar et al. .......................... 707/608 |
| 8,250,132 | B2 | * | 8/2012  | Adreon et al. ................ 709/201 |
| 2002/0035606 | A1 | * | 3/2002 | Kenton .......................... 709/206 |
| 2003/0033349 | A1 | * | 2/2003 | Lambert et al. ............... 709/201 |
| 2004/0205187 | A1 | * | 10/2004 | Sayal et al. .................... 709/224 |
| 2006/0069596 | A1 | * | 3/2006 | Hatoun et al. .................... 705/7 |
| 2006/0136279 | A1 | * | 6/2006 | Maybee et al. .................. 705/9 |
| 2007/0050227 | A1 | * | 3/2007 | Teegan et al. .................... 705/8 |

OTHER PUBLICATIONS

Resnick et al., Essential Windows Communication Foundation (2008).*
David Gristwood, Windows Workflow Foundation: Tracking Services Introduction.*
Ranjesh Jaganathan, Windows Workflow Foundation: Tracking Services Deep Dive.*
Chris J.T. Auld, Simple Human Workflow with Windows Workflow Foundation.*
Kenn Scribner, Microsoft Windows Workflow Foundation, Step by Step (2007).*
Author Unknown; "Using Correlation in Workflows"; 2009; pp. 1-3; http://msdn.microsoft.com/en-us/library/ms734588 (VS.85).aspx.

(Continued)

*Primary Examiner* — Meng An
*Assistant Examiner* — Benjamin Wu
(74) *Attorney, Agent, or Firm* — Workman Nydegger

(57) ABSTRACT

Embodiments are directed to generating trace events that are configured to report an association between a workflow activity and a message. A computer system receives a message over a communication medium, where the workflow activity includes a unique workflow activity identifier (ID) that uniquely identifies the workflow activity. The message also includes a unique message ID that uniquely identifies the message. The computer system generates a trace event that includes a combination of the unique workflow activity ID and the unique message ID. The trace event is configured to report the association between the workflow activity and the message. The computer system also stores the generated trace event in a data store.

18 Claims, 3 Drawing Sheets

OTHER PUBLICATIONS

Author Unknown; "Workflow Insights: Correlation"; Jan. 8, 2008; pp. 1-2; http://tomblog.insomniacminds.com/2008/01/08/workflow-insights-correlation/.

Bhatawdekar, Ameya; "Solution Starter: BizTalk Server Workflow"; Dec. 2003; pp. 1-8; http://msdn.microsoft.com/en-us/library/aa168476.aspx.

Basa, Sujoy; "Toward Web Service Dependency Discovery for SOA Management"; 2008; pp. 422-429; http://ieeexplore.ieee.org/stamp/stamp.jsp?tp=&isnumber=4578496&arnumber=4578551.

Author Unknown; "AddCorrelation"; 2003-2004; pp. 1-2; http://download.oracle.com/docs/cd/B14099_19/integrate.1012/b12163/evtapi40.htm.

Mezach, Jonathan; "Message based correlation with WF/WCF in .NET 3.5"; Feb. 24, 2009; pp. 1-2; http://blogs.infosupport.com/blogs/jonathan/archive/2009/02/24/Message-based-correlation-with-WF_2F00_WCF-in-.NET-3.5.aspx.

Thomas, Stephen W.; "Step by Step: Working with Content Based Correlation in Workflow 4.0"; Nov. 20, 2008; pp. 1-3; http://www.biztalkgurus.com/blogs/biztalk/archive/2008/11/20/step-by-step-working-with-content-based-correlation-in-workflow-4-0.aspx.

* cited by examiner

CORRELATING, LOGGING AND TRACING MESSAGING EVENTS BETWEEN WORKFLOW INSTANCES WITH GLOBALLY UNIQUE IDENTIFIERS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

One type of software is referred to as a "runtime". A runtime generally provides underlying functionality that can be used by multiple different applications that run on a computing system. Some runtimes, such as continuation-based runtimes, may be configured to execute activities as part of workflows. In some cases, these workflows are part of applications that are used in distributed environments. Accordingly, as workflow activities are executed at a runtime, the runtime may be configured to send messages or events to other computer systems indicating that some form of processing or other event has occurred (e.g. an execution failure or exception).

BRIEF SUMMARY

Embodiments described herein are directed to generating trace events that are configured to report an association between a workflow activity and a message. In one embodiment, a computer system receives a message over a communication medium, where the workflow activity includes a unique workflow activity identifier (ID) that uniquely identifies the workflow activity. The message also includes a unique message ID that uniquely identifies the message. The computer system generates a trace event that includes a combination of the unique workflow activity ID and the unique message ID. The trace event is configured to report the association between the workflow activity and the message. The computer system also stores the generated trace event in a data store.

In another embodiment, a computer system generates a unique message identifier (ID) for an outbound message that is to be sent to another workflow. The computer system associates the generated unique message identifier to the outbound message and generates a unique workflow activity ID which includes or is defined by a workflow instance ID, an activity ID and an activity instance ID. The computer system generates a trace event that includes a combination of the generated unique workflow activity ID and the outbound unique message ID. The trace event is configured to report the association between the outbound unique message ID and the unique workflow activity ID. The computer system also stores the generated trace event in a data store.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
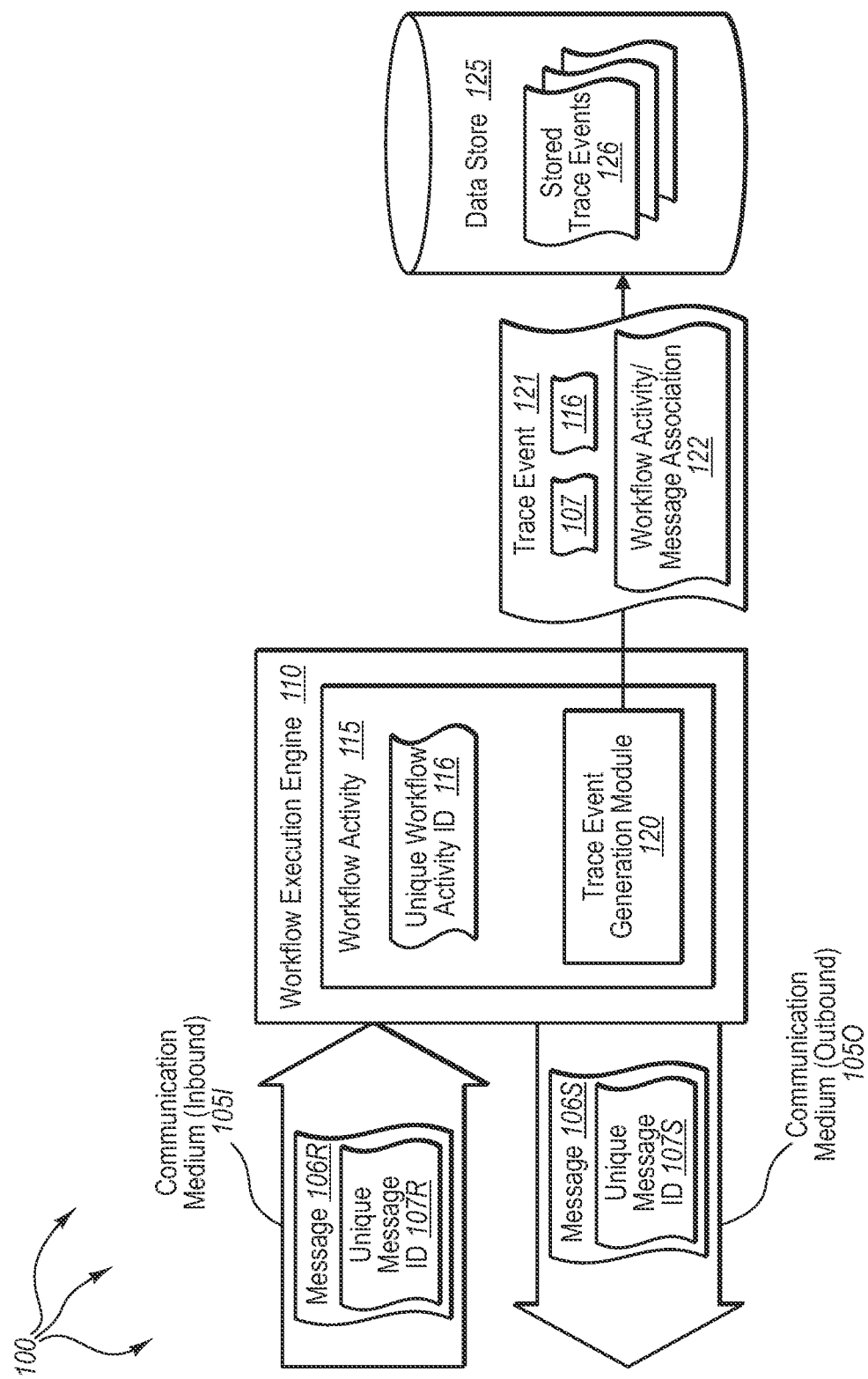
FIG. 1 illustrates a computer architecture in which embodiments of the present invention may operate including generating trace events that are configured to report an association between a workflow activity and a received message.

Embodiments described herein are directed to generating trace events that are configured to report an association between a workflow activity and a message. In one embodiment, a computer system receives a message over a communication medium, where the workflow activity includes a unique workflow activity identifier (ID) that uniquely identifies the workflow activity. The message also includes a unique message ID that uniquely identifies the message. The computer system generates a trace event that includes a combination of the unique workflow activity ID and the unique message ID. The trace event is configured to report the association between the workflow activity and the message. The computer system also stores the generated trace event in a data store.

In another embodiment, a computer system generates a unique message identifier (ID) for an outbound message that is to be sent to another workflow. The computer system associates the generated unique message identifier to the outbound message and generates a unique workflow activity ID including a workflow instance ID, an activity ID and an activity instance ID. The computer system generates a trace event that includes a combination of the generated unique workflow activity ID and the outbound unique message ID. The trace event is configured to report the association between the outbound unique message ID and the unique workflow activity ID. The computer system also stores the generated trace event in a data store.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, as discussed in greater detail below. Embodiments within the scope of the present invention also include physical and other computer-readable storage media for carrying or storing computer-executable instructions and/or data structures. Such computer-readable media can be any available media that can be accessed by a general purpose or special purpose computer system. Computer-readable media that store computer-executable instructions are physical storage media including recordable-type storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium, but not including propagation signals, which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes workflow execution engine 110. Engine 110 may be configured to execute activities which are part of workflows. Each workflow may include multiple different parent and child activities. These activities may be designed for execution in a predetermined order. This execution order may be specified in the activity's corresponding workflow. Accordingly, a software designer may indicate when each activity or logical tree of activities (with parent, child, grandchild, and other activities) is to be executed. Workflow activity 115 may include any code function, program or other portion of software configured to perform some type of work. Each workflow activity may be identified by a unique workflow activity identifier (ID) 116. This unique identifier may include any type of identification information such as unique combinations of numbers, letters, symbols or other characters. The unique ID 116 is unique across a system and is assigned to an activity for the lifetime of the activity.

Workflow execution engine 110 also includes trace event generation module 120. Trace events may be generated upon completion of a task or when a failure or exception occurs. For instance, if workflow activity 115 is being executed as a result of receiving a message 106R over communication medium 105I (inbound) indicating that activity 115 is to be executed and the execution throws an exception, a trace event 121 may be generated. The trace event may include information about the thrown exception, as well as information associating the message and the workflow activity. In such a case, it may be notable that a particular message (106R, identified by unique message ID 107R) initiated the activity, or is at least associated with the activity's execution. The generated trace event 121 may include both the message ID (107R) and the workflow activity ID (116), as well as a workflow activity/message association 122 that indicates the relationship between the received message and the activity.

These generated trace events may be stored (i.e. stored trace events 126) in a data store 125. The stored trace events may be accessible by various users including software designers performing debugging. For instance, if a designer wanted to determine where in a workflow's execution an exception was thrown, or which received message initiated execution of a particular activity, the generated trace events stored in store 125 would indicate what happened at each step. Trace event generation module 120 may also be configured to generate trace events when workflow activity 115 sends a message to another workflow engine or workflow activity. For example, module 120 may generate trace event 121 that includes unique message ID 107S which identifies message 106S sent over communication medium 105O (outbound), as well as the unique workflow activity ID for the activity that sent the message. Accordingly, when an activity sends or receives a message, the unique ID of that message, along with the message's corresponding activity, may be stored as a trace event in data store 125. Using these stored trace events 126, a user may create a pictorial depiction of the execution of a workflow. This, and other related concepts will be explained in greater detail below with regard to method 200 of FIG. 2.

Figure 2:
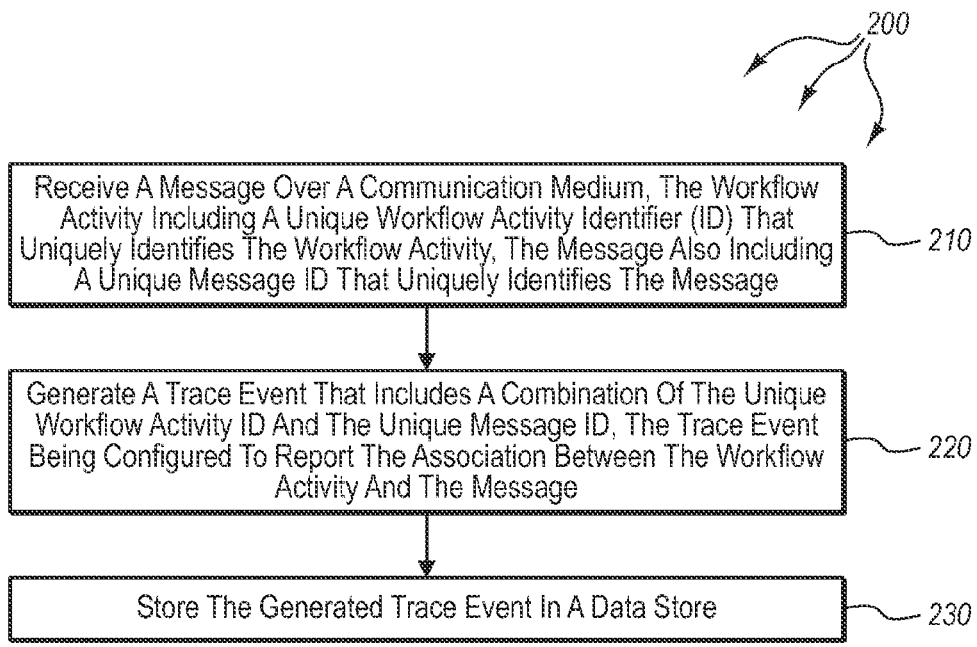
FIG. 2 illustrates a flowchart of an example method for generating trace events that are configured to report an association between a workflow activity and a received message.

FIG. 2 illustrates a flowchart of a method 200 for generating trace events that are configured to report an association between a workflow activity and a received message. The method 200 will now be described with frequent reference to the components and data of environment 100 of FIG. 1, as well as FIGS. 4A and 4B.

Method 200 includes an act of a workflow activity receiving a message over a communication medium, the workflow activity including a unique workflow activity identifier (ID) that uniquely identifies the workflow activity, the message also including a unique message ID that uniquely identifies the message (act 210). For example, workflow activity 115 may receive message 106R over communication medium 105I that includes unique message ID 107R that uniquely identifies message 106R. Activity 115 may also include unique workflow activity ID 116 that uniquely identifies activity 115. As used herein, communication media 105I (inbound) and 105O (outbound) may comprise any type of sending or receiving means including a message queue, a hypertext transfer protocol (HTTP) request and an application-specific message sent over an http channel. Many other forms of communication media are also possible.

As indicated above, message 106R may be associated with workflow activity 115 in some way. For instance, message 106R may indicate that activity 115 is to be executed or that a certain portion of a workflow's activities are to be executed. As with the unique workflow activity ID, the unique message ID may be unique across an entire workflow execution system and may be assigned to a particular message for the life of the message. Accordingly, a message may be immediately identifiable using its associated unique message ID. In some embodiments, the unique workflow activity ID may include or be comprised of multiple different unique identifiers. Accordingly, ID 116 may include the following: a workflow instance ID, activity ID, and activity instance ID.

As used herein, a workflow instance ID may be a unique identifier that uniquely identifies a particular execution instance of a workflow. For example, workflow execution engine 110 may be configured to process multiple instances of multiple different workflows. These workflow instances may be long running and, as such, may execute over a long period of time. Over this time period, a workflow may be unloaded and reloaded as necessary. Accordingly, when each workflow is loaded for execution, the workflow may be assigned a workflow instance ID which uniquely identifies that particular execution instance of the workflow. The activity ID may be the same as or similar to ID 116. The activity instance ID uniquely identifies a particular execution instance of activity 115. As with the workflow, each activity may be unloaded and reloaded at a later point in time. Moreover, some activities may include execution loops. In such cases, an activity instance ID would uniquely identify which loop the execution engine was currently processing. In such cases, the activity instance ID may be a continuously progressive number, changing for each iteration of the loop. Continuously progressive numbers may further be used to distinguish between parallel loops where multiple simultaneous instances of a single activity are being executing concurrently.

In one embodiment involving a long-running workflow, workflow engine 110 may receive a message 106R (including unique ID 107R) indicating that at least one of the workflow activities of a stored, long-running workflow is to be reinitialized to perform a portion of work. Engine 110 may load the workflow activity that has the same unique workflow activity ID it was stored with back into memory. Then, trace event generation module 120 may generate a new trace report 121 that includes a combination of the workflow activity's unique workflow activity ID 116 and the unique message ID 107, where the new trace event is configured to report the reestablished association (e.g. 122) between the long running workflow activity and the received message. Accordingly, during debugging, a software developer would be able to determine that received message 106R initiated re-initialization of the long-running workflow identified by ID 116.

Returning to FIG. 2, method 200 includes an act of the workflow activity generating a trace event that includes a combination of the unique workflow activity ID and the unique message ID, the trace event being configured to report the association between the workflow activity and the message (act 220). For example, trace event generation module 120 may generate trace event 121 that includes a combination of the unique workflow activity ID 116 and the unique message ID 107R associated with received message 106R. In some embodiments, if workflow execution has not already been started, the received message initiates execution of the workflow. Alternatively, if the workflow to which the message is directed is already executing, the message is routed to the executing workflow.

As indicated above, each workflow may be configured to generate a tracking record identifying portions of workflow state information. Workflow state information may include any information about the execution, current condition or values of settings, variables or other program information. Tracking records, as used herein, may be incorporated in trace events, or may be generated separately from trace events. In one example, a message may be received from another workflow. The message may indicate that the other workflow is initiating the first workflow to perform a portion of work. In this example, the tracking record of the other workflow and the tracking record of the first, original workflow are logically related. This comes as a result of the other workflow initiating the first workflow to perform a portion of work. Accordingly, messages and tracking records may be associated with various different logically related workflows. In some cases, a plurality of messages may be logically related to the same workflow.

Figure 4B:
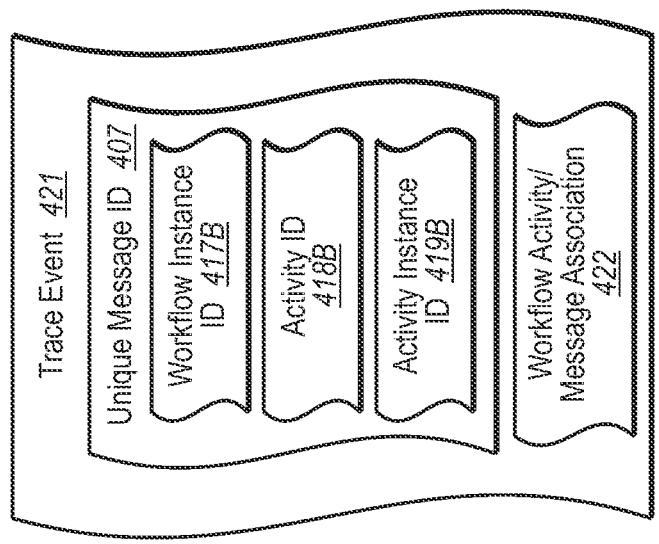
FIG. 4B illustrates an example embodiment of a trace event.
Figure 4A:
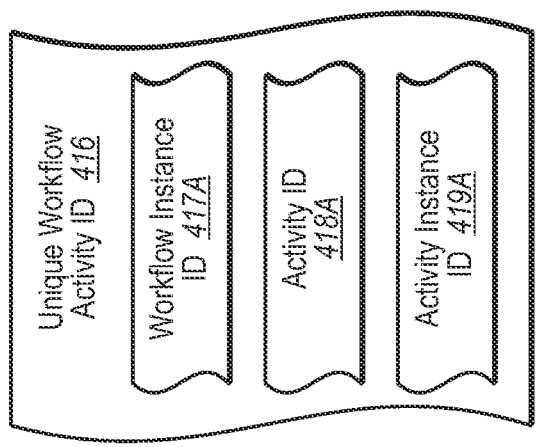
FIG. 4A illustrates an example embodiment of a unique workflow activity ID.

FIGS. 4A and 4B show embodiments of a unique workflow activity ID 416 and a trace event 421, respectively. In some embodiments, trace event 421 (which may or may not be the same as trace event 121), may include four values that associate a message to the workflow activity: message ID 407, workflow instance ID 417B, activity ID 418B, and activity instance ID 419B. Accordingly, a message ID may be associated or combined with the subcomponents of unique workflow activity ID 416 (i.e. workflow instance ID 417A, activity ID 418A and activity instance ID 419A). Trace event 421 also includes workflow activity/message association 422 which associates the message of message ID 407 with activity 416.

Returning again to FIG. 2, method 200 includes an act of storing the generated trace event in a data store (act 230). For example, workflow execution engine 110 may store generated trace event 121 in data store 125. Although shown as an external data store in FIG. 1, data store 125 may be internal to workflow execution engine 110 in some cases. Moreover, the trace events may be stored in a sufficiently generic manner, so that the trace events are accessible using a third party event tracing mechanism. Accordingly, the format of the generated trace events may be a standard, recognized form such as extensible markup language (XML), or some other sufficiently generic form. In this way, other users including third parties may be able to access and use the stored trace events 126.

As mentioned above, a user or software program may use the stored trace events to build a pictorial depiction of message transfers between two workflows based on stored trace events. Because (at least in some embodiments) a trace event is stored each time a workflow activity sends or receives a message from another workflow, and because each message, workflow instance, activity and activity instance is stored in the trace event, the user can piece together a pictorial view of the workflow activity's execution. This pictorial view may be sufficiently detailed so as to show, at any level of granularity, what took place during execution. Thus, a user or software program may be able to determine where (and even in which loop) an exception was thrown, an error occurred, a message was sent, a trace event was generated or where an activity completed successfully. It should be noted that a generated pictorial view may be configured to show many other aspects of workflow activity execution and that the above examples are not intended to limit what can be displayed in such a view.

Figure 3:
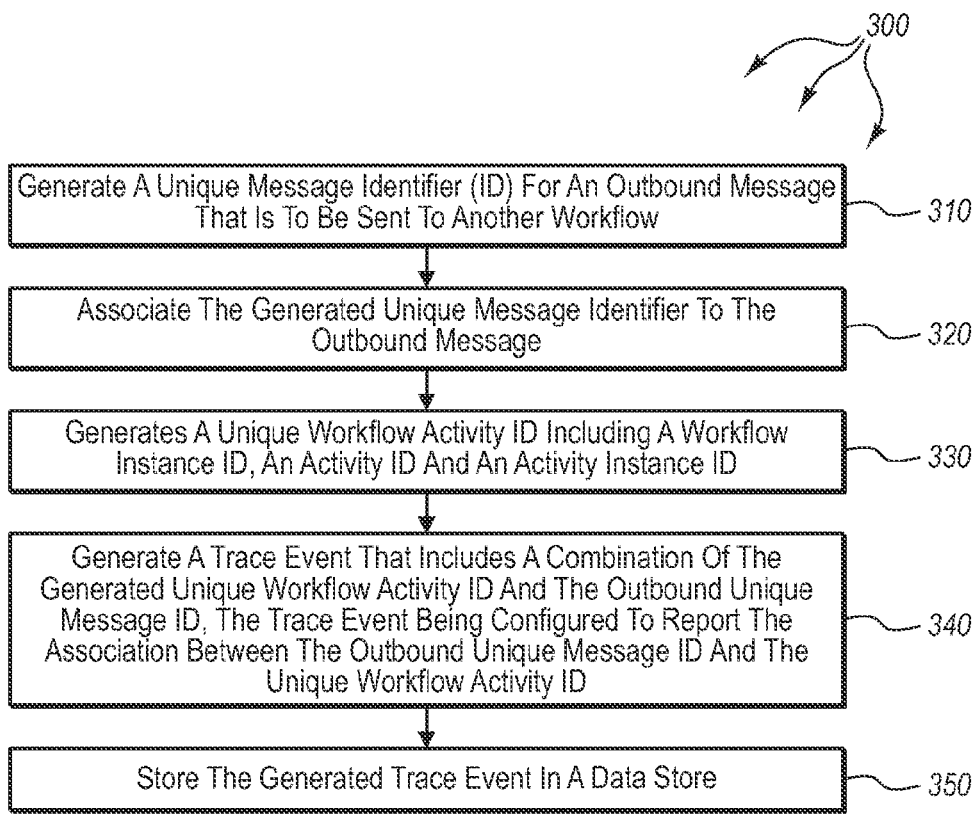
FIG. 3 illustrates a flowchart of an example method for generating trace events that are configured to report an association between a workflow activity and a message that is to be sent.

FIG. 3 illustrates a flowchart of a method 300 for generating trace events that are configured to report an association between a workflow activity and a message that is to be sent. The method 300 will now be described with frequent reference to the components and data of environment 100.

Method 300 includes an act of a workflow activity generating a unique message identifier (ID) for an outbound message that is to be sent to another workflow (act 310). For example, workflow execution engine 110 may generate a unique message ID 107S for outbound message 106S that is to be sent to another workflow. The message may, for instance, be configured to initiate a portion of work that is to be performed by the destination workflow.

Method 300 also includes an act of associating the generated unique message identifier to the outbound message (act 320). For example, workflow engine 110 may associate unique message ID 107S to message 106S. The associating may further include instructing the communication medium 105O over which the message is transferred to include the generated unique message ID in the message. For instance, if the communication medium is a message queue, engine 110 may instruct the message queue to include message ID 107S with one or more messages sent from a particular activity or workflow.

Method 300 includes an act of generating a unique workflow activity ID including a workflow instance ID, an activity ID and an activity instance ID (act 330). For example, workflow execution engine 110 may generate unique workflow activity ID 116 which includes a workflow instance ID, an activity ID and an activity instance ID. As explained above, each of these ID's identifies different information pertaining to the execution of a workflow and/or individual workflow activities.

Method 300 includes an act of generating a trace event that includes a combination of the generated unique workflow activity ID and the outbound unique message ID, the trace event being configured to report the association between the outbound unique message ID and the unique workflow activity ID (act 340). For example, trace event generation module 120 may generate trace event 421 which includes a combination of the generated unique workflow activity ID 416 and the outbound unique message ID 407. The trace event is also configured to store and report the association between the outbound unique message ID and the unique workflow activity ID. The combination of the unique message ID 407 and the workflow instance ID 417B, activity ID 418B and the activity instance ID 419B allows multiple portions of identification information to be stored in association with a software event. This information can be used by a software programmer or other user to determine the cause of events and aid the user in determining how to fix any perceived problems.

Method 300 also includes an act of storing the generated trace event in a data store (act 350). For example, trace event 421 may be stored in data store 125. Continuing the above example, upon storing the generated trace event, the outbound message may be sent to the other workflow, with the outbound message including both the outbound unique message ID and the unique workflow activity ID of the activity that sent the message. In this manner, the other workflow can then receive the message, identify which activity originated the message, and generate and store a trace event associated with the destination workflow.

Accordingly, a workflow execution engine may be configured to generate and monitor trace events relating to the execution of various workflows. The engine may generate unique identifiers for messages, workflows, workflow instances, activities and activity instances in order to identify where and why various functions are being performed. In this manner, a user can identify where problems occurred in a software program and further identify which corresponding workflows, activities and/or messages are involved in its execution.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computer-implemented method for generating trace events that are configured to report an association between a workflow activity of a workflow and a received message, the method comprising:

receiving, by a first workflow activity of a first workflow, a message over a communication medium, wherein the message was sent by a second workflow and indicates that the second workflow is initiating the first workflow to perform a portion of work included in the second workflow, and wherein the message further includes a unique workflow activity identifier (ID) that uniquely identifies the first workflow activity of the first workflow and a unique message ID that uniquely identifies the message;

generating, by the first workflow activity of the first workflow, a tracking record that includes one or more workflow state information related to the portion of work;

generating, by the first workflow activity of the first workflow, a trace event that includes a combination of the unique workflow activity ID and the unique message ID, wherein the trace event is configured to report the association between the first workflow activity and the message; and storing, by the first workflow activity of the first workflow, the generated trace event in a data store.

2. The method of claim 1, wherein the unique workflow activity ID comprises the following:
   a workflow instance ID, activity ID, and activity instance ID.

3. The method of claim 2, wherein the first workflow is a long running workflow.

4. The method of claim 3, further comprising:
   receiving, by a second workflow activity of the first workflow, a second message indicating that the second workflow activity of the first workflow is to be reinitialized to perform a portion of work included in the second workflow, wherein the first workflow is a stored, long-running workflow, and wherein the message includes a unique message ID;
   loading the second workflow activity back into memory, wherein the second workflow activity comprises the same unique workflow activity ID it was stored with;
   generating a new trace event that includes a combination of the second workflow activity's unique workflow activity ID and the unique message ID, the new trace event being configured to report the reestablished association between the long-running workflow and the received second message.

5. The method of claim 2, further comprising building a pictorial depiction of messages sent and received between the first and second workflows based on stored trace events.

6. The method of claim 5, wherein the pictorial depiction visually indicates the occurrence of a failure in the first or second workflow and further indicates where in the first or second workflow the error occurred.

7. The method of claim 6, wherein the activity instance ID indicates which loop iteration the activity is on.

8. The method of claim 2, wherein the activity instance ID is a continuously progressive number, such that the activity instance ID provides execution order information.

9. The method of claim 1, wherein a tracking record in the second workflow and the tracking record of the first workflow are logically related as a result of the second workflow initiating the first workflow to perform the portion of work.

10. The method of claim 1, wherein a plurality of messages are logically related to the first or second workflow.

11. The method of claim 1, wherein the trace event generated by the first workflow activity includes four values that associate the message to the workflow activity: workflow instance ID, activity ID, activity instance ID, and message ID.

12. The method of claim 1, wherein the trace event is stored such that the trace event is accessible using a third party event tracing application.

13. The method of claim 1, wherein the received message is received by the first workflow that is currently executing or wherein the received message initiates execution of the first workflow if the first workflow has not already been started.

14. A computer program product for implementing a method for generating trace events that are configured to report an association between a workflow activity and a message that is to be sent, the computer program product comprising one or more recordable-type computer-readable storage media having stored thereon computer-executable instructions that, when executed by one or more processors of the computing system, cause the computing system to perform the method, the method comprising:
   generating, by a first workflow activity of a first workflow, an outbound message to be sent over a communication medium, wherein the message will be received by a second workflow and indicates that the first workflow is initiating the second workflow to perform a portion of work included in the first workflow, and wherein the message further includes a unique workflow activity identifier (ID) that uniquely identifies the first workflow activity of the first workflow and a unique message ID that uniquely identifies the message;
   generating, by the first workflow activity of the first workflow, a tracking record that includes one or more workflow state information related to the portion of work;
   generating, by the first workflow activity of the first workflow, a trace event that includes a combination of the unique workflow activity ID and the unique message ID, wherein the trace event is configured to report the association between the workflow activity and the outbound message; and
   storing, by the first workflow activity of the first workflow, the generated trace event in a data store.

15. The computer program product of claim 14, further comprising sending, by the first workflow activity of the first workflow, the outbound message to the second workflow, wherein the outbound message includes both the unique message ID and the unique workflow activity ID.

16. The computer program product of claim 14, wherein sending the outbound message further includes instructing the communication medium over which the message is to be sent to add the generated unique message ID to the message.

17. The computer program product of claim 16, wherein the communication medium comprises at least one of a message queue, an http request and an application-specific message sent over an http channel.

18. A computer system comprising the following:
   one or more processors;
   system memory;
   one or more recordable-type computer-readable storage media having stored thereon computer-executable instructions that, when executed by the one or more processors, causes the computing system to perform a method for generating trace events that are configured to report an association between a workflow activity of a workflow and a received message, the method comprising:
   receiving, by a first workflow activity of a first workflow, a message over a communication medium, wherein the message was sent by a second workflow and indicates that the second workflow is initiating the first workflow to perform a portion of work included in the second workflow, and wherein the message further includes a unique workflow activity identifier (ID) that uniquely identifies the first workflow activity of the first workflow and a unique message ID that uniquely identifies the message;
   generating, by the first workflow activity of the first workflow, a tracking record that includes one or more workflow state information related to the portion of work;
   generating, by the first workflow activity of the first workflow, a trace event that includes a combination of the unique workflow activity ID and the unique message ID, wherein the trace event is configured to report the association between the workflow activity and the message; and
   storing, by the first workflow activity of the first workflow, the generated trace event in a data store.

* * * * *